United States Patent Office 3,429,167
Patented Feb. 25, 1969

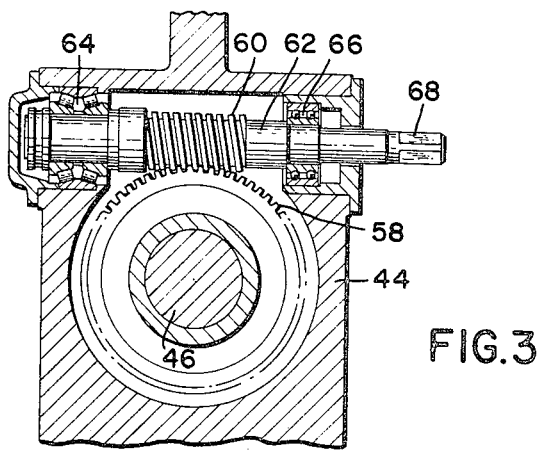
FIG.3
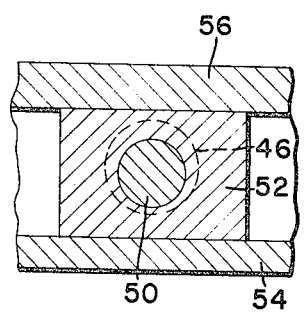
FIG.4
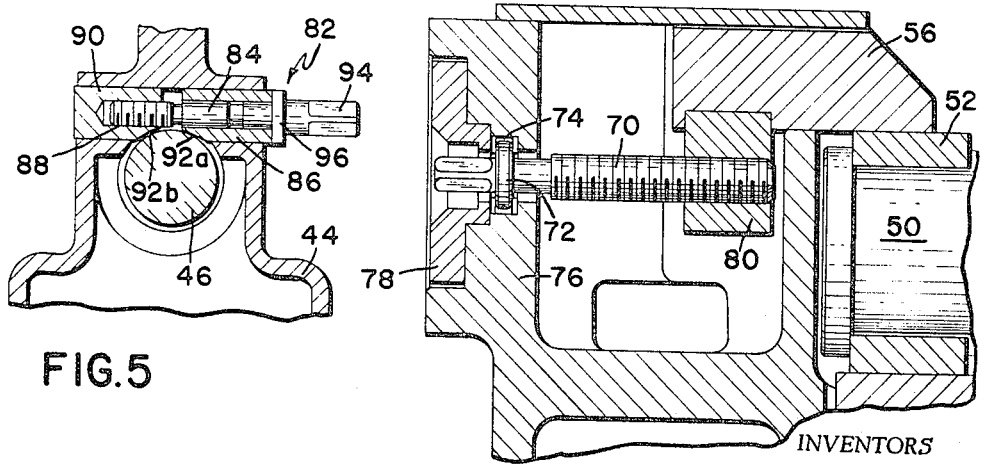
FIG.5
FIG.6

3,429,167
AXIAL ROLL ADJUSTING MECHANISM
Donald Sieurin, Northboro, and William J. Hill, Holden, Mass., assignors to Morgan Construction Company, Worcester, Mass., a corporation of Massachusetts
Filed Apr. 12, 1966, Ser. No. 542,172
U.S. Cl. 72—247      8 Claims
Int. Cl. B21b 31/18, 27/00

ABSTRACT OF THE DISCLOSURE

An apparatus for axially adjusting a work roll journalled for rotation between bearing chocks. The apparatus includes a rotatable shaft extending through one of the bearing chocks in a direction transverse to the rotational axis of the work roll. The ends of the shaft form eccentrics extending beyond the sides of the bearing chock. The eccentrics are journalled within bearing blocks slidably abutting a fixed reference surface, the latter extending in a plane transverse to the rotational axis of the work roll. Rotation of the shaft and its eccentrics thus causes the work roll to be axially displaced relative to the fixed reference surface.

---

This invention relates generally to rolling mills and more particularly to an improved means for axially adjusting individual work rolls.

In any rolling operation, the roll grooves which form a roll pass must be aligned accurately with each other. To this end, an adjusting mechanism is usually associated with at least one roll in each roll stand to thus provide operating personnel with a means for bringing oppositely disposed roll grooves into alignment. Although satisfactory in many respects, experience has shown that the axial roll adjusting mechanisms of known construction have several problems associated therewith, problems which prior to the present invention had not been solved to the complete satisfaction of those skilled in the art. For example, some conventional axial roll adjusting mechanisms include linkage arrangements which cannot be accurately calibrated. This greatly complicates the task of properly adjusting oppositely disposed roll grooves with the high degree of accuracy required in modern high speed rolling operations. Other known adjustment mechanisms, which depend on counteracting screws, offer a higher degree of accuracy, but only if considerable time and care is expended by operating personnel, a factor which in turn leads to excessive periods of down time.

In addition, the axial roll adjusting mechanisms of known construction are usually included as integral parts of the roll housings, thus making it necessary to wait until after the work rolls have been installed in the housings before performing initial axial roll adjustments. This in turn prolongs the period of down time required for roll changing.

These problems have now been overcome in a novel manner by the present invention, a general object of which is to provide an improved axial roll adjusting mechanism which is simple to operate and which can be adjusted quickly with a high degree of accuracy.

Another object of the present invention is to provide an axial roll adjusting mechanism which can be assembled with the roll and its associated bearing chocks and thereafter installed in the roll housing as a single unit.

A further object of the present invention is to provide an axial roll adjusting mechanism embodying rotatable cam means carried by the roll chocks.

A still further object of the present invention is to provide means for bringing the work rolls into proper axial adjustment prior to installing them in the roll housing.

These and other objects of the present invention will become more apparent as the description proceeds with the aid of the accompanying drawings in which:

FIG. 3 is a sectional view taken along line 3—3 of FIG. 2;

FIG. 4 is a sectional view taken along line 4—4 of FIG. 2;

FIG. 5 is a sectional view taken along line 5—5 of FIG. 2;

FIG. 6 is an enlarged detailed illustration showing a preferred embodiment of the means for laterally displacing the keeper plates;

Figure 1:
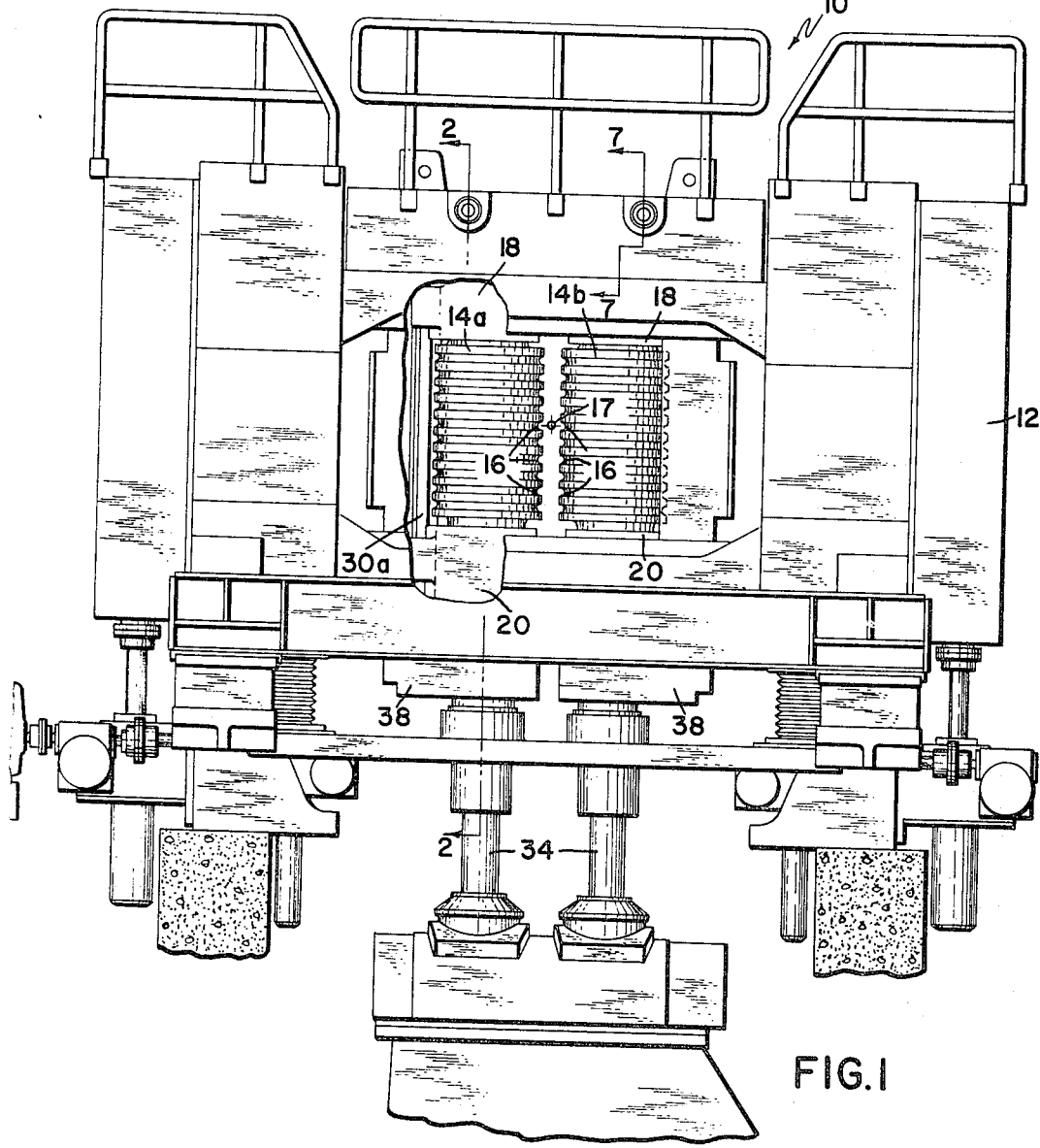
FIG. 1 is a view in front elevation of a typical vertical roll stand embodying the concepts of the present invention, with portions of the housing broken away.

Referring initially to FIG. 1, a vertical roll stand generally indicated by the reference numeral 10 is shown comprised basically of a housing structure 12 having rotatably mounted therein a pair of work rolls 14a and 14b. The work rolls are each provided with a series of grooves 16 which cooperate when the work rolls are properly spaced and aligned to provide a plurality of roll passes. Depending on the elevation to which housing structure 12 is adjusted, one of the roll passes will be placed in alignment with the mill pass line 17.

Figure 2:
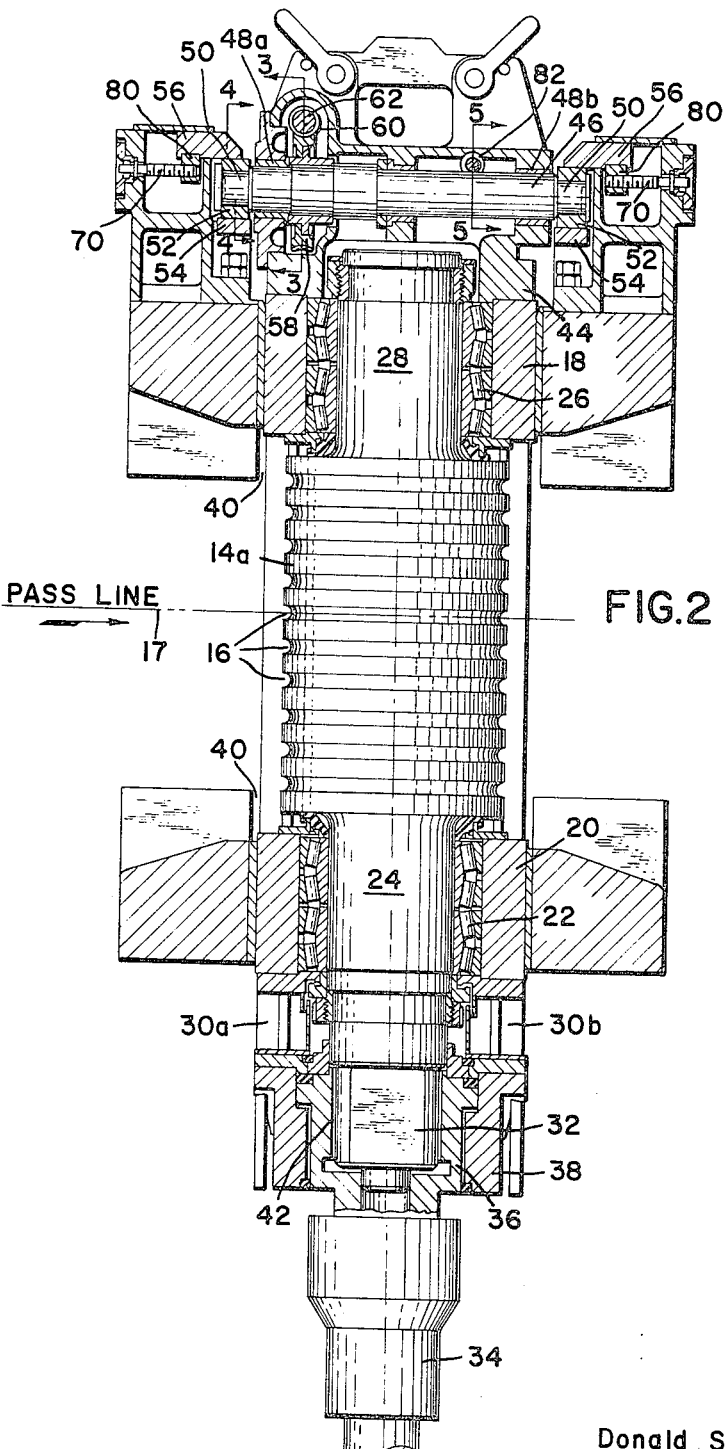
FIG. 2 is a sectional view on an enlarged scale taken along line 2—2 of FIG. 1.

As can be best seen by further reference to FIG. 2, work roll 14a is journaled for rotation between upper and lower bearing chocks 18 and 20. The lower bearing chock 20 includes a roller bearing assembly 22 surrounding the lower roll neck 24. Similarly, the upper bearing chock 18 includes a second roller bearing assembly 26 surrounding upper roll neck 28. The bearing chocks 18 and 20 are held in a vertically aligned relationship on a common guide surface which in the embodiment herein disclosed, is comprised of spaced parallel guide tracks 30a and 30b. The wobbler end 32 of work roll 14a is connected to an underlying drive spindle 34 by means of an eccentric coupling 36 contained within a third chock 38, also mounted on guide tracks 30a and 30b. Although not illustrated in detail, it is to be understood that work roll 14b is similarly journaled between upper and lower bearing chocks slidably mounted on a second set of vertical guide tracks. Work roll 14b is also connected to an underlying drive spindle 34 by means of an eccentric coupling contained in a third chock 38.

During initial assembly, the drive spindles 34, eccentric couplings 36 and third chocks 38 are first lowered as preassembled units through the housing windows 40 with each third chock being slidably engaged on the spaced parallel sets of vertical guide tracks 30a and 30b. After the third chocks 38 have been secured in place, the work rolls 14a and 14b with their associated bearing chocks already assembled thereon, are then lowered, also as preassembled units, through the housing windows 40 with the bearing chocks again being slidably engaged on the same guide tracks. The work rolls are lowered until their wobbler ends 32 are inserted into the drive sockets 42 of the eccentric couplings contained within the third chocks 38. Thereafter, the bearing chocks are locked in place in axial alignment with the third chocks 38, thus readying the roll stand for operation.

This general arrangement of guide tracks 30a and 30b used to maintain the upper and lower bearing chocks 18 and 20 in vertical axial alignment with separable third chocks 38 is now known to those skilled in the art, as is apparent from the discolsure contained in U.S. patent application Serial No. 357,140, filed Apr. 3, 1964, now Patent No. 3,314,263. However, the present invention is not directed to this general arrangement, but rather to an improved means for axially adjusting at least one work roll to achieve the desired accurate alignment between opposed grooves on each work roll. Although the description will hereinafter proceed with reference to a vertical roll stand, it should be understood that the invention may be employed equally as well with horizontal roll stands.

A preferred embodiment of the present invention will now be described in detail, with further reference being made to FIG. 2 wherein it can be seen that the upper bearing chock 18 includes an upper portion 44 containing a horizontally disposed shaft 46 journaled for rotation between sleeve bearings 48a and 48b. The ends of shaft 46 are identical in construction and extend laterally beyond the sides of the upper chock portion 44 to form eccentrics 50. As is best shown in FIG. 4, each eccentric is journaled for rotation in a bearing block 52, the latter being adapted to be held between a horizontal rail 54 on the roll housing 12 and an overlying keeper plate 56 for horizontal slidable movement in a direction transverse to the length of guide tracks 30a and 30b.

Shaft 46 is further provided with a gear 58 which meshes with a worm 60 (see FIG. 3) on a transverse operating shaft 62 journaled for rotation in the upper chock portion 44 between a thrust bearing 64 and a roller bearing 66. One end of the operating shaft 62 protrudes beyond the side of upper chock portion 44 and is suitably adapted as at 68 to be engaged by a wrench or crank (not shown).

Figure 7:
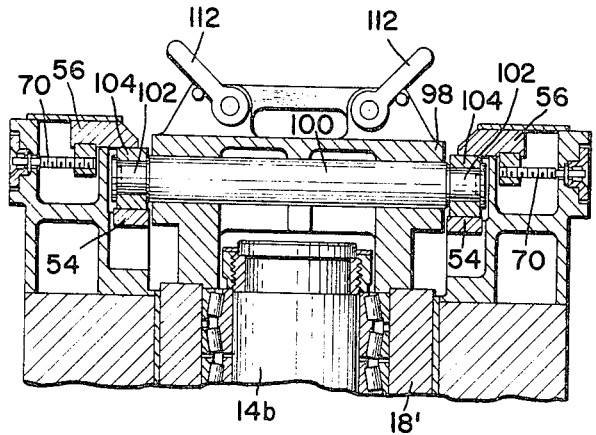
FIG. 7 is a sectional view on an enlarged scale taken along line 7—7 of FIG. 1; and, FIG. 8 is a view of a set-up stand with a pair of work rolls temporarily suspended therein.

As can be further seen in FIG. 7, the upper bearing chock 18' on work roll 14b is also provided with an upper portion 98 containing a horizontally disposed shaft 100. The ends 102 of shaft 100 form cylindrical extensions having mounted thereon bearing blocks 104. The bearing blocks 104 ars also adapted to be slidably held between the horizontally extending rails 54 on housing 12 and the overlying keeper plates 56.

When installing a roll assembly in housing 12, the keeper plates 56 are first laterally withdrawn to expose the underlying support rails 54. As is best shown in FIG. 6, this is accomplished by rotating bolts 70 in a clockwise direction. The bolts are each provided at one end with radial shoulders 72 held by bushings 78 within recesses 74 in an upstanding rim 76 of the housing. The other ends of the bolts 70 are threaded into blocks 80 depending from the keeper plate 56. Thus, rotation of bolts 70 in either a clockwise or counterclockwise direction will result in either withdrawal or advancement of the keeper plates 56.

With the keeper plates 56 laterally withdrawn, the preassembled units which include the work rolls 14a and/or 14b and upper and lower bearing chocks 18 and 20 are then lowered through the housing windows 40 with the bearing chocks slidably engaged on the pairs of vertically disposed guide rails 30a and 30b. The rolls are lowered until the bearing blocks 52 and 104 come to rest on the horizontal rails 54, at which point the wobbler ends 32 of the rolls are fully inserted into the drive sockets 42 of the eccentric couplings 36. The keeper plates 56 are then advanced to the operative position shown in the drawings, thus slidably holding the bearing blocks 52 down on the underlying rails 54.

Figure 8:
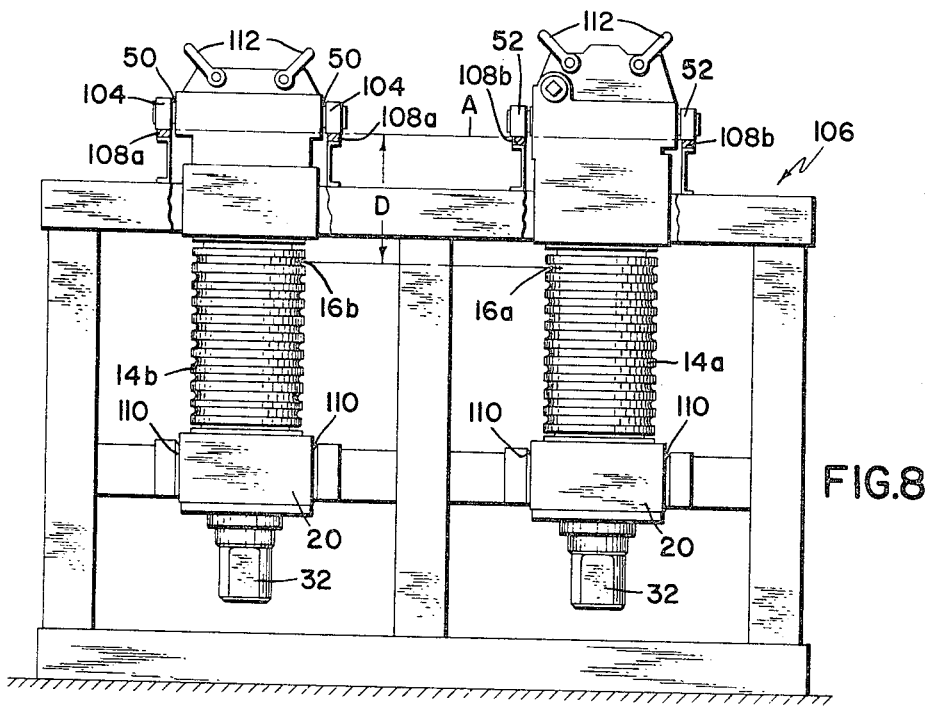

Prior to being installed in the roll housing 12, the work rolls 14a and 14b are first temporarily suspended in a "set-up" stand such as that generally indicated by the reference numeral 106 in FIG. 8. Stand 106 is comprised basically of a rigid frame structure which includes two sets of spaced parallel horizontally extending support rails 108a and 108b. The support rails are arranged to lie in the same horizontal plane A. This arrangement permits work roll 14a to be temporarily suspended within the set-up stand 106 with the bearing blocks 52 on the eccentrics 50 of shaft 46 resting on the support rails 108b.

Work roll 14b is similarly suspended in a depending laterally adjacent position with the bearing blocks 104 on the cylindrical extensions 102 of shaft 100 (see FIG. 7) resting on the support rails 108a. When suspended in this fashion, the lower bearing chocks 20 on both rolls are slidably held between opposed guide surfaces 110.

At this point, the first set of roll grooves (hereinafter referred to for illustrative purposes as 16a and 16b) to be employed in the next rolling operation are checked for proper alignment. This may be accomplished by simply measuring the distance D between roll groove 16b and reference plane A. The vertical distance between groove 16a and plane A should be the same. If it is not, work roll 14a is axially adjusted in the following manner: by rotating operating shaft 62, shaft 46 is caused to rotate due to the meshed relationship of worm 60 with gear 58. Rotation of shaft 46 will of course result in corresponding rotation of eccentrics 50 within bearing blocks 52. The horizontal throw of the eccentrics will be dissipated without imparting any horizontal movement to the work roll, due to the slidable relationship between bearing blocks 52 and support rails 108b. However, the vertical throw of the eccentrics will cause the entire roll assembly, including the work roll 14a and its upper and lower bearing chocks 18 and 20 to be either raised or lowered, depending on the adjustment required to bring groove 16a into alignment with the groove 16b on work roll 14b. Once this has been accomplished, shaft 46 is locked against further rotation by use of a lock assembly, a preferred embodiment of which is generally indicated in FIG. 5 by the reference numeral 82. Lock assembly 82 is comprised basically of a transverse shaft 84 journaled for rotation at one end in a sleeve bearing 86 and threaded as at 88 at the other end into a second sleeve 90. The sleeves 86 and 90, which are provided respectively with oppositely inclined shaft engaging faces 92a and 92b, are each slidably mounted for axial movement relative to the upper portion 44 of chock 18. When shaft 84 is rotated in a clockwise direction, as by the application of a wrench or tool (not shown) to the specially adapted end 94, the threaded sleeve 90 is pulled toward the right (as shown in FIG. 5) as the slidable bearing sleeve 86 is pushed to the left due to the force exerted by an annular shoulder 96 on shaft 84. As the threaded sleeve 90 and bearing sleeve 88 are pulled together, their respective beveled faces 92a and 92b bear on the surface of shaft 84, thus exerting a wedging action tending to prevent rotation of shaft 46.

With the roll grooves 16a and 16b in proper alignment and with shaft 46 locked in place, the work rolls 14a and 14b are now ready to be installed in the roll housing 12. It should of course be understood that by having spare roll assemblies temporarily mounted in set up stands adjacent each roll stand in the mill, the foregoing alignment operation can be carried out while the rolling operation is in progress. When a roll change is required, the mill is first shut down and the worn rolls removed from the roll stands. Thereafter, the fresh rolls, which have already been brought into proper axial alignment, are lifted by means of an overhead crane (not shown) attached to lifting eyes 112 on the upper bearing chocks and carried to the roll stands where they are lowered into place through the housing windows 40. When the roll assemblies are lowered into the roll housing, roll grooves 16a and 16b will again be placed in alignment due to the fact that the bearing blocks 52 and 104 will now be supported on the horizontally extending rails 54, it being understood that the upper surfaces of rails 54 are contained within the same horizontal plane. The keeper plates 56 are then laterally advanced to hold the bearing blocks down on guide rails 54, thus completing the roll installation.

When the roll housing 12 is subsequently raised or lowered to change roll grooves, should further axial adjustment of roll 14a be required, lock assembly 82 is simply disengaged to free shaft 46. This having been done, the eccentrics 50 are rotated within the bearing blocks 52 to effect the desired adjustment with a minimum loss of time.

Having thus described a preferred embodiment of the invention, its operation and some of the advantages gained thereby will now be briefly reviewed. The use of eccentrics 50 on shaft 46, which eccentrics are journaled for rotation in bearing blocks 52 adapted to be slidably mounted on housing 12, is particularly advantageous in that the axial adjustments imparted to the work rolls are directly related to the rotational displacement of shaft 46. This arrangement permits accurate calibration of the adjusting mechanism and thus greatly facilitates its use by operating personnel. In addition, the entire axial roll adjusting mechanism is included in the upper portion 44 of one bearing chock 18, the latter being mounted on the work roll together with the lower roll chock 20 to thus provide a preassembled portable unit. This of course enables operating personnel to axially adjust spare roll assemblies while the rolling operation is in progress. Thereafter, when a roll change is required, the preadjusted spare rolls are quickly installed with a minimum loss of valuable operating time.

In view of the above, it can now be seen by those skilled in the art that the invention is equally adapted for use in horizontal roll stands where the bearing chocks on each roll are slidably aligned against a common horizontally extending guide surface. Under these conditions, the bearing blocks 52 within which the eccentrics 50 are journaled would be slidably mounted for vertical movement in a direction transverse to the said guide surface. The basic principle of operation would however remain unchanged.

It is our intention to cover all changes and modifications of the embodiment herein disclosed which do not depart from the spirit and scope of the invention defined by the claims appended hereto.

It is claimed:

1. In a rolling mill, for use with a work roll rotatably supported between roll chocks, the said chocks being adapted to be mounted within a roll housing in a manner permitting axial movement of said roll relative to the mill pass line, means for axially adjusting said work roll comprising: rotatable eccentric means carried by one of said chocks, said eccentric means being journalled for rotation within bearing means, the said bearing means in turn being mounted on said housing for movement in a direction transverse to the axis of said roll; and, operating means for rotating said eccentric means, thus causing said chocks and the work roll supported therebetween to be axially adjusted relative to said housing.

2. The apparatus as set forth in claim 1 wherein said work roll, roll chocks, eccentric means, bearing means and operating means are assembled as a single portable unit capable of being subsequently installed in a roll housing.

3. The apparatus as set forth in claim 1 further characterized by longitudinal guide means on said housing for slidably supporting said bearing means for movement in a direction transverse to the mill pass line.

4. The apparatus as set forth in claim 3 wherein said eccentric means is comprised of a rotatable shaft extending through said one roll chock, the rotational axis of said shaft extending in a direction transverse to the rotational axis of said work roll, the end portions of said shaft protruding beyond opposite sides of said chock, said eccentrics carried by the protruding end portions of said shaft for rotation therewith.

5. The apparatus as set forth in claim 4 wherein said bearing means is comprised of bearing blocks, each said bearing blocks being slidably confined on said housing for movement as aforesaid between a fixed surface and a parallel keeper plate.

6. The apparatus as set forth in claim 5 further characterized by means for laterally withdrawing said keeper plate to an inoperative position, thus permitting removal of the work roll, roll chocks, eccentrics, bearing blocks and operating means as a single unit from the roll housing.

7. The apparatus as set forth in claim 6 wherein said operating means is comprised of a first gear carried by said shaft for rotation therewith, and an operating shaft having a second gear thereon meshing with said first gear, whereby rotation of said operating shaft will result in rotation of the shaft carrying said eccentrics.

8. In a roll stand for a rolling mill, said roll stand including at least one work roll journaled for rotation between roll chocks, means for axially adjusting said work roll relative to the mill pass line comprising: spaced parallel guide members on the roll housing, the roll chocks of said work roll being adapted to be slidably mounted on said guide members in a manner permitting axial movement of the work roll relative to the pass line; a shaft journaled for rotation in one of the said roll chocks; eccentric means carried by said shaft for rotation therewith; bearing means slidably supported on said housing for movement in a direction transverse to the rotational axes of said work roll, said eccentric means being journaled for rotation within said bearing means; and, operating means for rotating said shaft to thereby impart axial adjustment to said work roll relative to the mill pass line.

References Cited

UNITED STATES PATENTS

| | | | |
|---|---|---|---|
| 2,213,714 | 9/1940 | Mekeel et al. | 72—247 |
| 2,335,800 | 11/1943 | Sheperdson et al. | 72—247 |
| 2,774,263 | 12/1956 | Leufven | 72—247 |
| 3,055,242 | 9/1962 | Wilson | 72—247 |

FOREIGN PATENTS

| | | |
|---|---|---|
| 431,332 | 3/1925 | Germany. |
| 688,479 | 3/1953 | Great Britain. |

CHARLES W. LANHAM, *Primary Examiner.*

A. RUDERMAN, *Assistant Examiner.*